United States Patent Office 2,911,435
Patented Nov. 3, 1959

2,911,435

PROCESS OF PREPARING DIMETHYL-2,2,2-TRICHLORO - 1 - N - BUTYRYLOXYETHYLPHOSPHONATE

John E. Casida and Belton Wayne Arthur, Madison, Wis., assignors to Wisconsin Alumni Research Foundation, Madison, Wis., a corporation of Wisconsin No Drawing. Application April 3, 1957
Serial No. 650,323

3 Claims. (Cl. 260—461)

The present invention relates to improved processes of preparing compounds characterized by insecticidal properties and more specifically to the preparation of compounds represented by the following general formula:

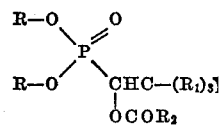

where R represents lower alkyl groups containing 1–4 carbon atoms, $R_1$ is selected from the group consisting of hydrogen and halogen atoms, and $R_2$ represents an alkyl group containing 1–7 carbon atoms. At least one $R_1$ is preferably chlorine or bromine. In one of the preferred compounds (dimethyl-2,2,2-trichloro-1-n-butyryloxyethylphosphonate), the R's represent methyl groups, $R_1$ represents chlorine and $R_2$ represents the n-propyl ($C_3H_7$) group. This compound which is characterized by potent insecticidal activity combined with unusually low mammalian toxicity, is described and claimed in our copending application, Serial No. 628,511, filed December 17, 1956.

The compounds of the present invention represented by the above formula can be prepared by reacting a di-lower alkyl (R) phosphite (I) with a compound (II) represented by the following formula:

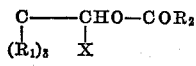

where R, $R_1$ and $R_2$ are as represented above and X is a halogen such as chlorine or bromine. The reaction can be conveniently carried out by warming the reactants, e.g. in equimolar amounts over a steam bath (100° C.), for about 2 hours, adding water, extracting the resulting aqueous reaction mixture with a water-immiscible organic solvent such as hexane and evaporating the solvent to recover the desired di-lower alkyl-2-halo-1-acyloxyethylphosphonate.

Intermediate or compound II above can be prepared by reacting mono-, di-, or trichloro acetaldehyde with an acyl chloride ($R_2COCl$) such as acetyl chloride, propionyl chloride, valeryl chloride, capryryl chloride, etc. The reaction of chloral with butyryl chloride, for example gives α-chloro-β-trichloro-ethyl-n-butyrate, the intermediate used to prepare the preferred butyryloxy compound noted above. Compound II can also be prepared by chlorinating or brominating the compound

or by chlorinating its related unsaturated compound $Cl_2C=CHOCOR_2$. Where $R_2$ is $C_3H_7$, compound

is prepared by reacting β-trichloroethanol with butyric anhydride, and compound $Cl_2C=CHOCOC_3H_7$ is prepared by reacting dichloroacetaldehyde with butyric anhydride. The chloral acylchlorides can also be prepared as described by Deodhar in Jl. Indian Chem. Soc. 11, 83–86 (1934).

The following examples will serve to illustrate the invention.

EXAMPLE I

*α-Chloro-β-trichloro-ethyl-n-butyrate*

To 0.2 mole (29.5 g.) of chloral and 0.02 mole (.27 g.) freshly fused and powdered zinc chloride in a 200 cc. Erlenmeyer flask equipped with a condenser and calcium chloride tube and a dropping funnel and placed upon a magnetic stirrer, are added dropwise with stirring 0.22 mole (23.5 g.) of n-butyryl chloride. After addition of the acid chloride the reaction mixture is placed on a steam bath for about 3 hours. The chloro-ethyl-n-butyrate is then recovered from the reaction mixture as an oil by distillation at atmospheric pressure at approximately 100° C.

*Dimethyl - 2,2,2 - trichloro - 1 - n - butyryloxyethylphosphonate*

About 0.1 mole of the α-chloro-β-trichloro-ethyl-n-butyrate prepared as above is mixed with 0.1 mole of dimethyl phosphite and the mixture heated on a steam bath for about 2 hours. About 100 cc. of water is then added and the resulting aqueous reaction mixture extracted twice with 100 cc. portions of hexane. The solvent is then distilled off to yield the desired butyryloxyethylphosphonate as an oil. This product is then preferably finally stripped under vacuum to remove any butyric anhydride that may be present.

EXAMPLE II

The product of Example I can also be prepared by reacting 0.2 mole of $PCl_3$ with 0.6 mole of anhydrous methanol and 0.2 mole of α-chloro-β-trichloro-ethyl-n-butyrate. The reaction can be conducted by adding the methanol dropwise to the $PCl_3$ and the α-chloro-β-trichloro-ethyl-n-butyrate in non-polar solvents such as ether, then removing the solvent by distillation and holding the reaction mixture from two to four hours on a steam bath. Water is then added and the desired butyryloxy compound is recovered by hexane extraction and stripping under vacuum as in Example I.

EXAMPLE III

*α-Chloro-β-trichloro-ethyl-acetate*

This product is prepared in accordance with Example I by using 0.22 mole of acetyl chloride in place of butyryl chloride.

*Dimethyl - 2,2,2 - trichloro - 1 - acetyloxyethylphosphonate*

This product is prepared by reacting the α-chloro-β-trichloro-ethyl-acetate with dimethyl phosphite as described in Examples I or II. This compound has good insecticidal properties with relatively low mammalian toxicity compared to the product which lacks the 1-acetyloxy group. The 1-acetyloxy compound is described and claimed in our copending application Serial No. 628,506, filed December 17, 1956.

Various other compounds can be prepared in accordance with the processes of the present invention by reacting the appropriate di-lower-alkyl phosphite (e.g. diethyl-, dipropyl- or dibutyl-phosphites) with the appropriate chloral acyl chlorides. Examples are diethyl-2,2,2 - trichloro-1-n-valeryloxyethylphosphonate; dibutyl-2,2,2-trichloro-1-n-capryryloxyethylphosphonate, etc. The corresponding bromo-derivatives can be prepared by use of the appropriate bromo-intermediates in place of the chloro-intermediates. The compounds are obtained as oils and are characterized by being soluble in hydrocarbon distillates such as kerosene and the like.

We claim:

1. The process of preparing dimethyl-2,2,2-trichloro-1-n-butyryloxyethylphosphonate which comprises reacting dimethyl phosphite with α-chloro-β-trichloro-ethyl-n-butyrate at a temperature of about 100° C.

2. The process of preparing dimethyl-2,2,2-trichloro-1-n-butyryloxyethylphosphonate which comprises reacting di-methylphosphite with α-chloro-β-trichloro-ethyl-n-butyrate in a molar ratio of about 1:1 on a steam bath for about 2 hours, adding water to the reaction mixture, extracting the resulting aqueous mixture with hexane, and recovering the dimethyl-2,2,2-trichloro-1-n-butyryloxyethylphosphonate from the hexane by evaporating the hexane.

3. The process of preparing dimethyl-2,2,2-trichloro-1-n-butyryloxyethylphosphonate which comprises reacting phosphorus trichloride and anhydrous methanol with α-chloro-β-trichloro-ethyl-n-butyrate.

References Cited in the file of this patent

Kosolapoff: "Organo-Phosphorus Compounds," John Wiley & Sons, Inc., N.Y. (1950), pages 124, 182.